(12) United States Patent
Quach et al.

(10) Patent No.: US 10,749,686 B2
(45) Date of Patent: Aug. 18, 2020

(54) SYSTEM AND METHOD FOR AUTHENTICATING MULTIPLE SEPARATE OBJECTS USING ONE SIGNATURE VIA CHAIN OF TRUST

(71) Applicant: ARRIS Enterprises LLC, Suwanee, GA (US)

(72) Inventors: Nguyen Thanh Quach, San Diego, CA (US); Walter H. Anderes, San Diego, CA (US); David L. Berger, El Cajon, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 368 days.

(21) Appl. No.: 15/906,639

(22) Filed: Feb. 27, 2018

(65) Prior Publication Data

US 2018/0262342 A1 Sep. 13, 2018

Related U.S. Application Data

(60) Provisional application No. 62/470,503, filed on Mar. 13, 2017.

(51) Int. Cl.
*H04L 29/06* (2006.01)
*G06F 21/57* (2013.01)
*H04L 9/32* (2006.01)
*G06F 21/64* (2013.01)

(52) U.S. Cl.
CPC ............ *H04L 9/3247* (2013.01); *G06F 21/57* (2013.01); *G06F 21/575* (2013.01); *G06F 21/64* (2013.01); *H04L 9/3236* (2013.01)

(58) Field of Classification Search
CPC ..... H04L 9/3247; H04L 9/3236; G06F 21/57; G06F 21/575; G06F 21/64
See application file for complete search history.

(56) References Cited

U.S. PATENT DOCUMENTS

| 2009/0327753 | A1* | 12/2009 | Ferren | ................ | G06F 21/575 |
| | | | | | 713/189 |
| 2012/0303963 | A1* | 11/2012 | Murao | ................ | H04L 9/3263 |
| | | | | | 713/178 |

* cited by examiner

*Primary Examiner* — Amir Mehrmanesh
(74) *Attorney, Agent, or Firm* — Wenderoth, Lind & Ponack, L.L.P.

(57) ABSTRACT

A method is provided for authenticating two distinct objects using a single signature stored on one of the objects. On initiation of a hardware system a valid hash value can be generated based at least in part on a rootdisk file and a kernel can be modified to contain the valid hash value. On subsequent boots of the hardware system, the valid hash value stored within the kernel can be compared with a value of a potential rootdisk file and if the valid hash value and the rootdisk hash value match, the hardware system can proceed with the boot process.

3 Claims, 8 Drawing Sheets

SYSTEM AND METHOD FOR AUTHENTICATING MULTIPLE SEPARATE OBJECTS USING ONE SIGNATURE VIA CHAIN OF TRUST

CROSS REFERENCE TO RELATED APPLICATIONS

This Application claims priority under 35 U.S.C. § 119(e) from earlier filed U.S. Provisional Application Ser. No. 62/470,503, filed Mar. 13, 2017, the entirety of which is incorporated herein by reference.

BACKGROUND

Technical Field

The present disclosure generally related to the field of object authentication and more specifically to the authentication of multiple objects using a single signature.

Related Art

Upon system boot, the platform to be loaded in a system must be authenticated typically via a signature generated via an external system. In systems where the platform is contained in a single file, such validation is not particularly complex or time consuming since only a single signature validation is required. However, in system where the platform is split across two independent files, a kernel and a RootDisk, current systems require independent validation of each of the two components, thus doubling the verification burden and potentially slowing the boot process. What is needed is a system wherein a kernel file can be embedded with a signature associated with the RootDisk such that the kernel can authenticate the RootDisk directly wherein on the kernel file is authenticated from an outside source.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of authentication including: accessing a kernel; determining a valid hash value associated with said kernel; accessing a potential rootdisk; determining a potential rootdisk hash value associated with said potential rootdisk; comparing said valid hash value and said potential rootdisk hash value; and authenticating said potential rootdisk, if said valid hash value and said potential rootdisk hash value are identical. Other embodiments of this aspect include corresponding computer systems, apparatus, and computer programs recorded on one or more computer storage devices, each configured to perform the actions of the methods.

The method of authentication may also include determining said valid hash value from a valid rootdisk. The method of authentication may also include encoding a valid hash value within said kernel. The method of authentication can comprise a step of determining said valid hash value from said valid rootdisk is based at least in part on a hash table associated with said valid rootdisk. The method of authentication can also comprise a step of determining said potential hash value from said potential rootdisk is based at least in part on a hash table associated with said potential rootdisk. The method of authentication further including: rejecting said potential rootdisk, if said valid hash value and said potential rootdisk hash value are other than identical. The method of authentication further including: rejecting said potential rootdisk, if said valid hash value and said potential rootdisk hash value are other than identical. Implementations of the described techniques may include hardware, a method or process, or computer software on a computer-accessible medium.

One general aspect includes a system of authentication including: instantiating in a first portion of memory a valid hash value associated with a kernel, instantiating in a second portion of memory a hash value associated with a potential rootdisk, comparing said valid hash value associated with said kernel and said hash value associated with said potential rootdisk, and initiating installation of said potential rootdisk in a third portion of memory if said valid hash value associated with said kernel matches said hash value associated with said potential rootdisk. Other embodiments of this aspect include corresponding computer systems, apparatus, and computer programs recorded on one or more computer storage devices, each configured to perform the actions of the methods.

Implementations may include one or more of the following features. The system further including: instantiating in a forth portion of memory said valid hash value based at least in part on a valid rootdisk, and modifying said kernel to include said valid hash value.

BRIEF DESCRIPTION OF THE DRAWINGS

Further details of the present invention are explained with the help of the attached drawings in which.

DETAILED DESCRIPTION

Figure 1:
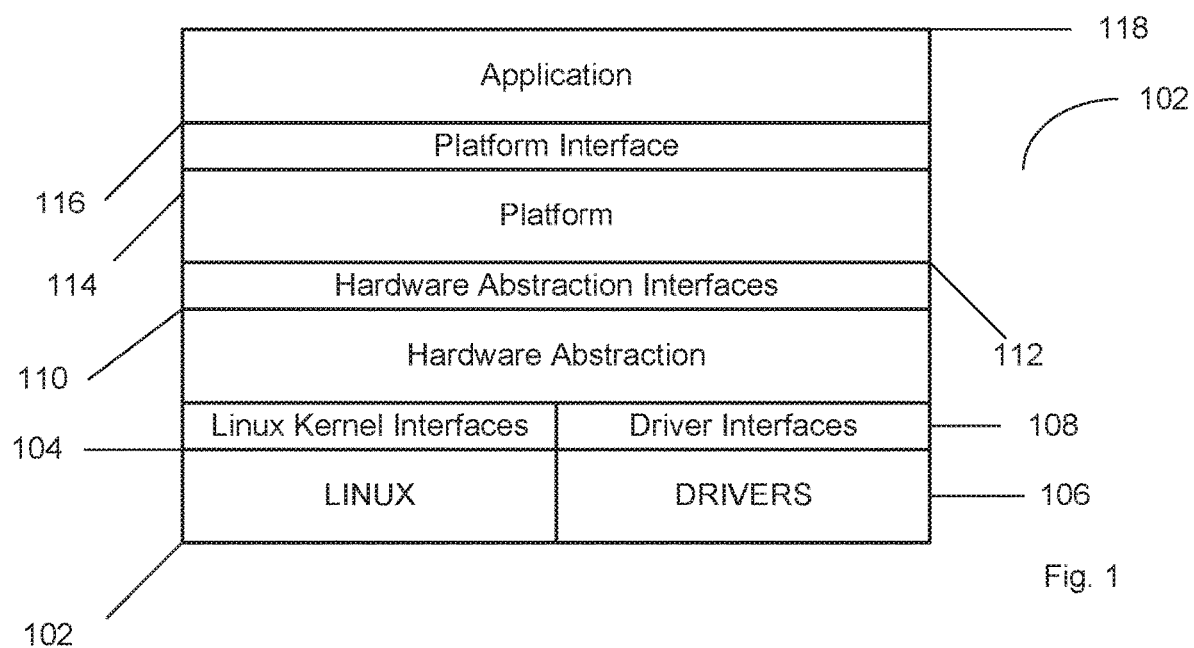
FIG. 1 depicts an overview of a platform for video display.

FIG. 1 depicts an overview of a platform for video display 100. In the embodiment depicted in FIG. 1, the platform for video display 100 can comprise multiple layers. In the embodiment depicted in FIG. 1, the platform for video display 100 can be comprised of a Linux layer 102, a Linux kernel interfaces' layer 104, a drivers' layer 106, a driver interfaces' layer 108, a hardware abstraction layer 110, a hardware abstraction interfaces' layer 112, a platform layer 114, a platform interfaces' layer 116 and an application(s)' layer 118. However, in alternate embodiments, additional and/or fewer layers may be included in the platform for video display 100. Moreover, in some embodiments, the layers can be associated in an alternate configurations from that depicted in FIG. 1.

In operation, the Linux layer 102 and the Linux kernel interfaces' layer 104 can have control over the overall computer system, such as memory allocation, peripheral controls, input/output request processing/handling, translation/sequencing of data processing instructions/request and general processing controls and can be the first process commenced upon startup. The drivers' layer 106 and driver interfaces' layer 108 can handle communications between input/output devices and peripherals and between the various layers.

As depicted in FIG. 1, the hardware abstraction layer 110 can represent the hardware present within the system 100 that can be controlled and the hardware abstraction interfaces' layer 112 can act as an interface between the physical hardware and the system 100. The platform layer 114 and the platform interfaces layer 116 serve to enable video reception and delivery of video to the display and audio systems coupled with the system and one or more application layers can enable the system 100 to perform functions as desired.

Figure 2A:
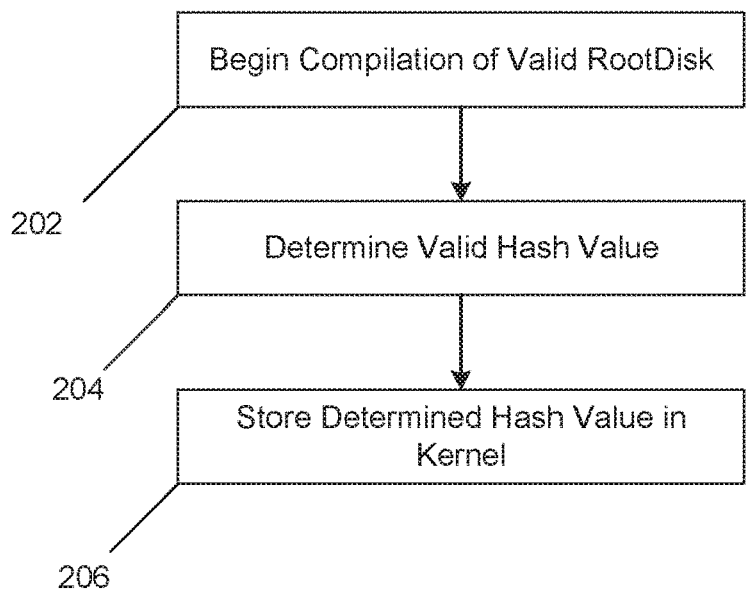
FIG. 2a depicts an embodiment of a system and method of encoding a kernel

FIG. 2a depicts an embodiment of a system and method of encoding a kernel 200. In the embodiment depicted in FIG. 2a, in step 202 a valid rootdisk can be selected and initiation and/or compilation of the valid rootdisk can be commenced and in step 204 a valid hash value can be determined from the valid rootdisk. Then in step 206 the determined valid hash value can be stored within a kernel. In some embodiments the valid hash value can be stored in an independent file within the kernel.

Figure 2B:
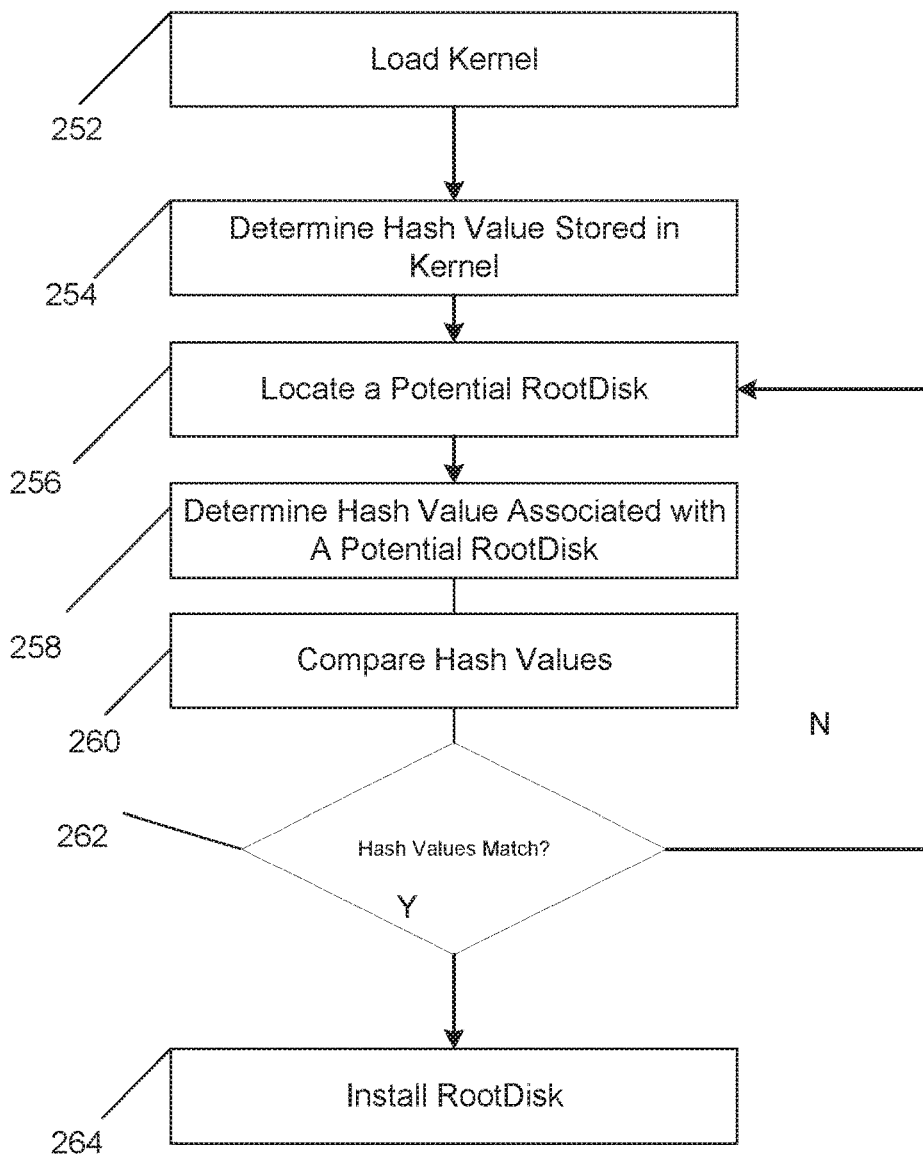
FIG. 2b depicts an embodiment of a system and method for authenticating a rootdisk

FIG. 2b depicts an embodiment of a system and method for authenticating a rootdisk 250. In the embodiment depicted in FIG. 2b, in step 252 a kernel can be instantiated in memory. Then in step 254 the valid hash value associated with the kernel can be determined from the kernel. In step 256 a potential rootdisk can be located and/or identified. Then in step 258, a hash value associated with the potential rootdisk can be determined. In step 260, the valid hash value and the hash value associated with the potential rootdisk can be compared. If in step 262, the comparison results in a match between the valid hash value and the hash value associated with the potential rootdisk, then in step 264 the potential rootdisk can be installed. If in step 262, the comparison does not result in a match between the valid hash value and the hash value associated with the potential rootdisk, then the system may not install the potential rootdisk and can proceed to step 256 and locate a new potential rootdisk. However, in some embodiments, if in step 262, the comparison does not result in a match between the valid hash value and the hash value associated with the potential rootdisk, then the system may not install the potential rootdisk and can trigger an error.

Figure 3A:
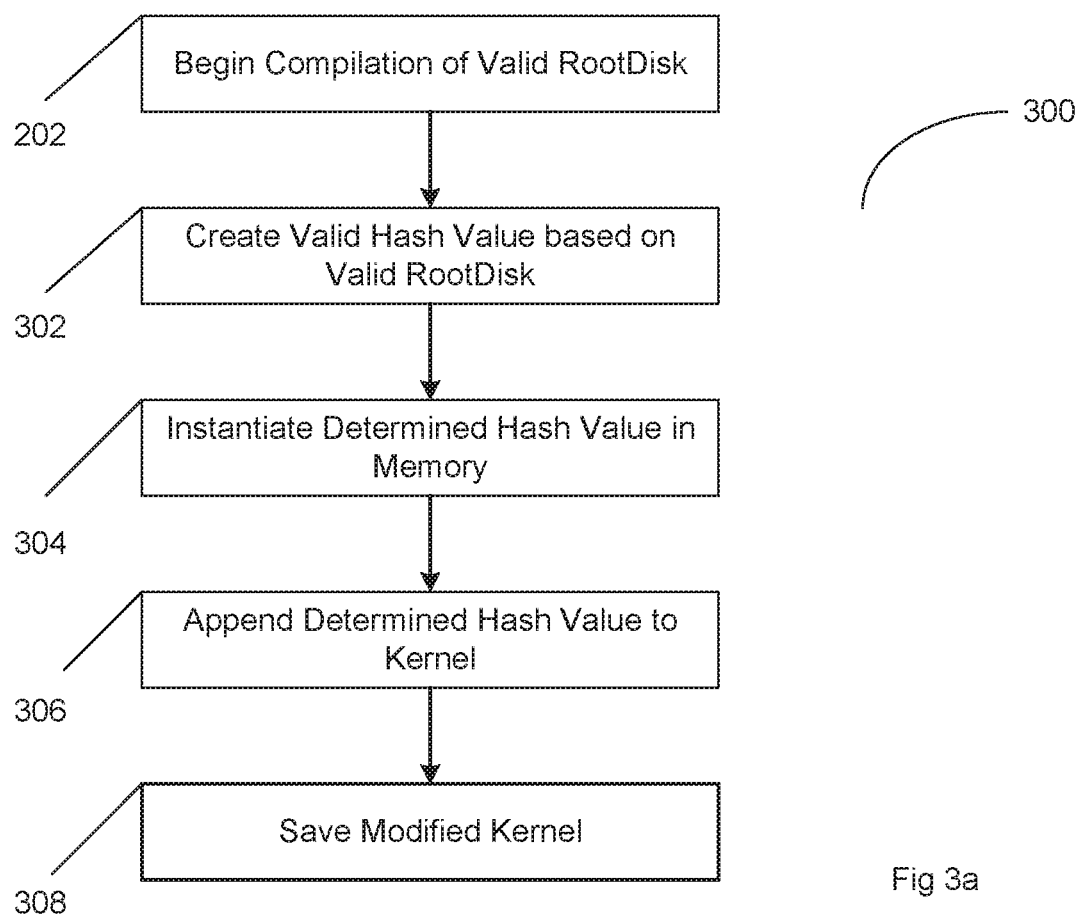
FIG. 3a depicts an embodiment of a system and method of encoding a kernel

FIG. 3a depicts an embodiment of a system and method of encoding a kernel 300. In the embodiment depicted in FIG. 3a, in step 202 a valid rootdisk can be selected and initiation and/or compilation of the valid rootdisk can be commenced and in step 302 a valid hash value can be created based, at least in part, on the valid rootdisk. In step 304 the valid hash value can be instantiated in memory and in step 306 the valid hash value can be appended to the kernel and the modified kernel can then be stored in step 308. In some embodiments the valid hash value can be stored in an independent file within the kernel.

Figure 3B:
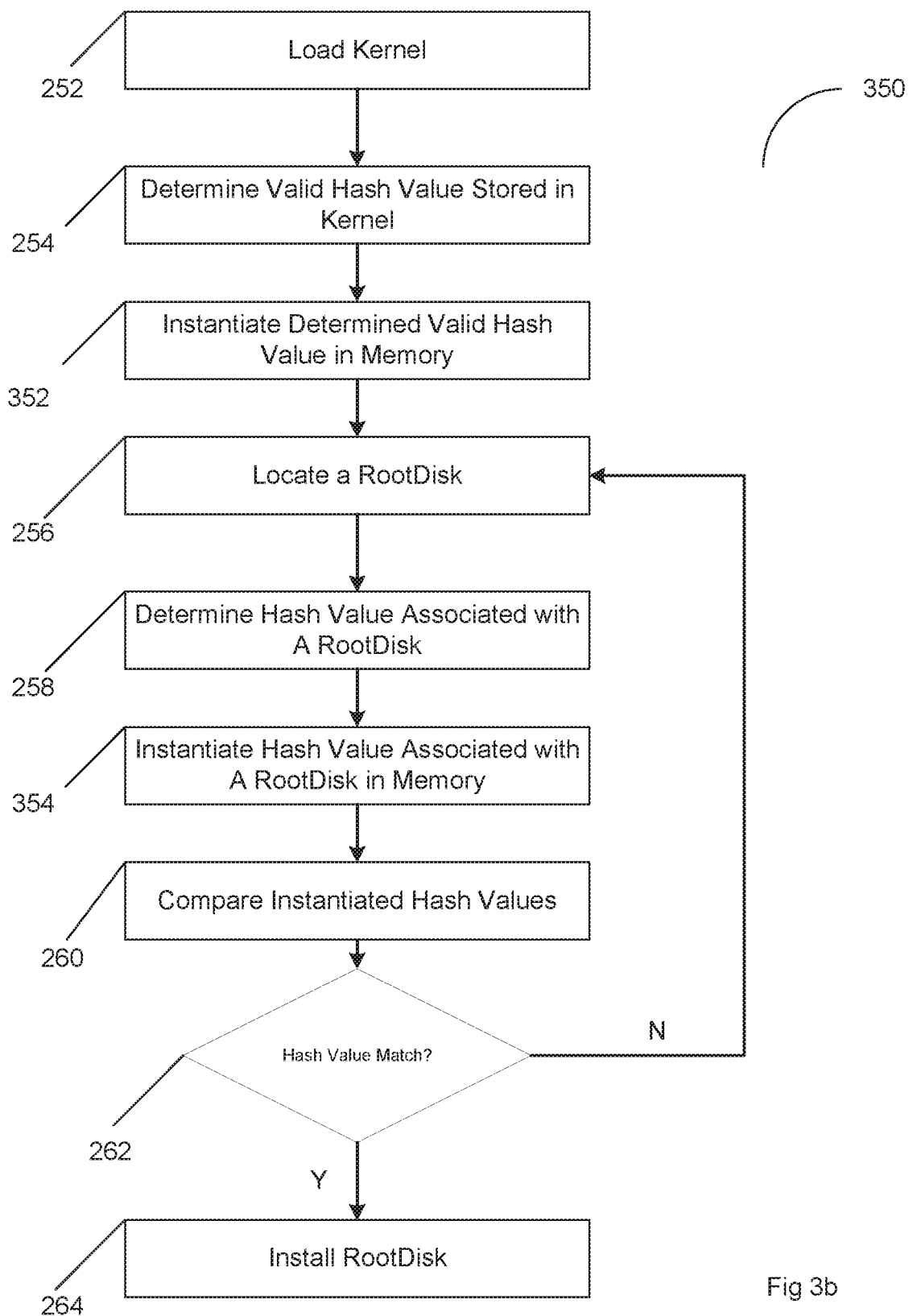
FIG. 3b depicts an embodiment of a system and method for authenticating a rootdisk

FIG. 3b depicts an embodiment of a system and method for authenticating a rootdisk 350. In the embodiment depicted in FIG. 3b, in step 252 a kernel can be instantiated in memory. Then in step 254 the valid hash value associated with the kernel can be determined from the kernel and instantiated in memory in step 352. In step 256 a potential rootdisk can be located and/or identified. Then in step 258, a hash value associated with the potential rootdisk can be determined and instantiated in memory in step 354. In step 260, the valid hash value and the hash value associated with the potential rootdisk can be compared. If in step 262, the comparison results in a match between the valid hash value and the hash value associated with the potential rootdisk, then in step 264 the potential rootdisk can be installed. If in step 262, the comparison does not result in a match between the valid hash value and the hash value associated with the potential rootdisk, then the system may not install the potential rootdisk and can proceed to step 256 and locate a new potential rootdisk. However, in some embodiments, if in step 262, the comparison does not result in a match between the valid hash value and the hash value associated with the potential rootdisk, then the system may not install the potential rootdisk and can trigger an error.

Figure 4A:
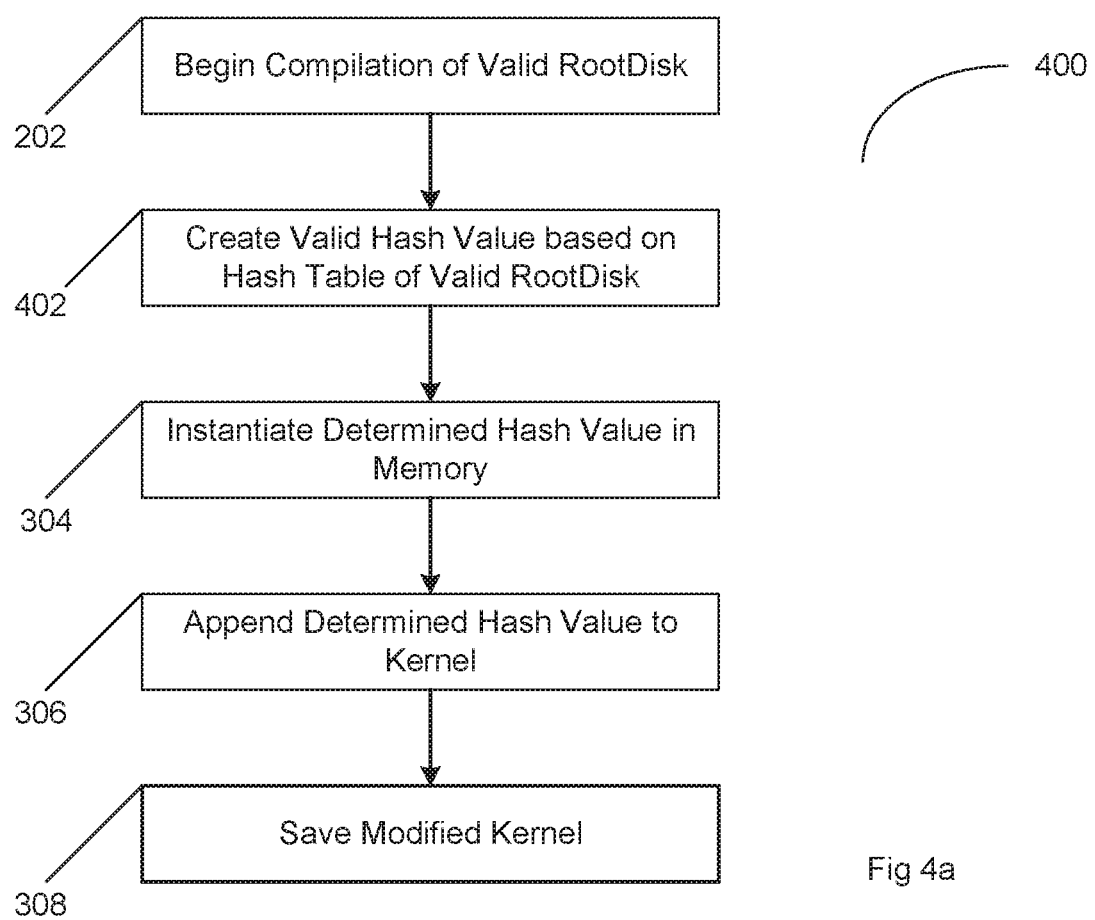
FIG. 4a depicts an embodiment of a system and method of encoding a kernel

FIG. 4a depicts an embodiment of a system and method of encoding a kernel 400. In the embodiment depicted in FIG. 4a, in step 202 a valid rootdisk can be selected and initiation and/or compilation of the valid rootdisk can be commenced and in step 402 a valid hash value can be created based, at least in part, on the hash table of the valid rootdisk. In step 304 the valid hash value can be instantiated in memory and in step 306 the valid hash value can be appended to the kernel and the modified kernel can then be stored in step 308. In some embodiments the valid hash value can be stored in an independent file within the kernel.

Figure 4B:
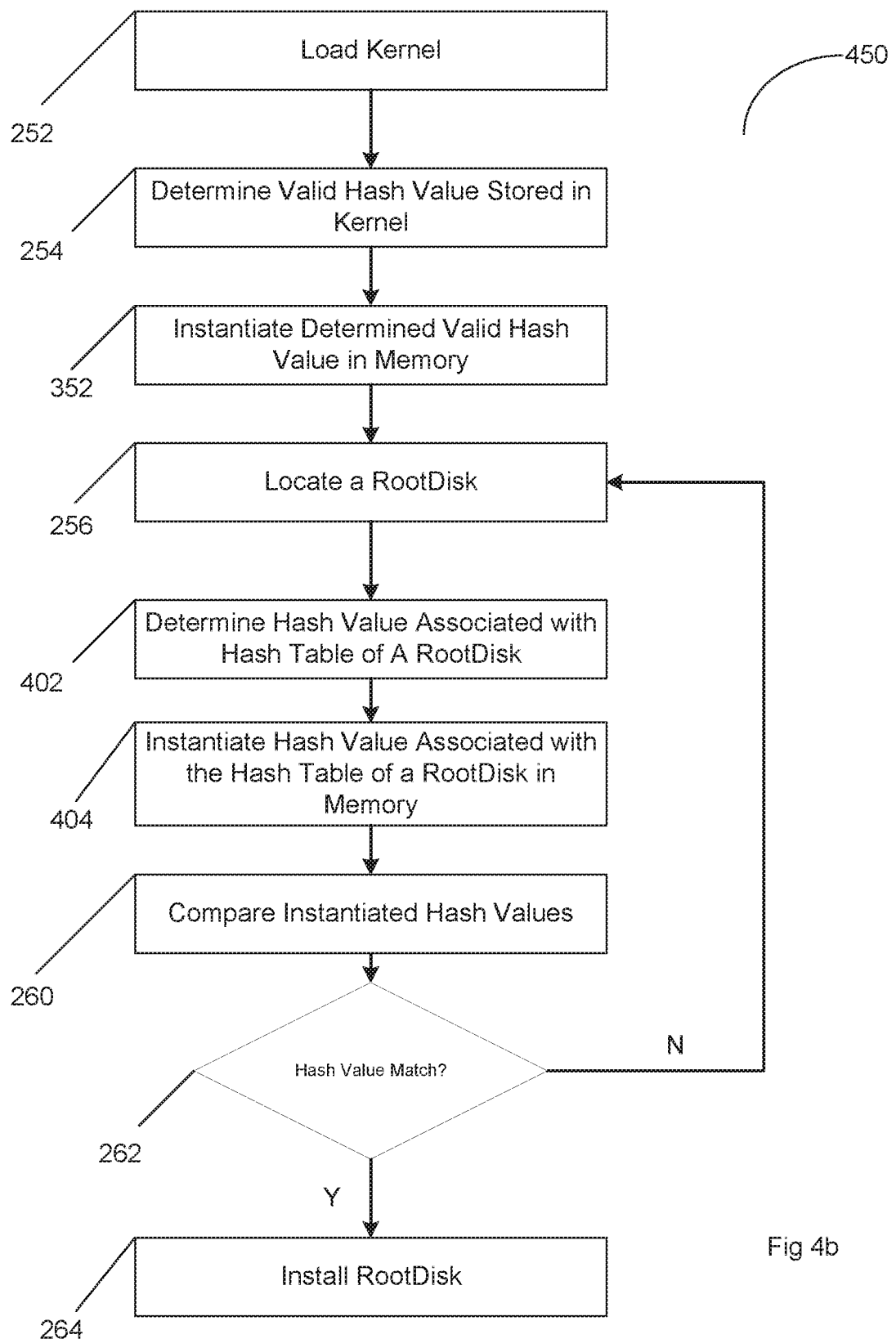
FIG. 4b depicts an embodiment of a system and method for authenticating a rootdisk

FIG. 4b depicts an embodiment of a system and method for authenticating a rootdisk 450. In the embodiment depicted in FIG. 4b, in step 252 a kernel can be instantiated in memory. Then in step 254 the valid hash value associated with the kernel can be determined from the kernel and instantiated in memory in step 352. In step 256 a potential rootdisk can be located and/or identified. Then in step 402, a hash value calculated based at least in part on the hash table of the potential rootdisk can be determined and instantiated in memory in step 404. In step 260, the valid hash value and the hash value associated with the potential rootdisk can be compared. If in step 262, the comparison results in a match between the valid hash value and the hash value associated with the potential rootdisk, then in step 264 the potential rootdisk can be installed. If in step 262, the comparison does not result in a match between the valid hash value and the hash value associated with the potential rootdisk, then the system may not install the potential rootdisk and can proceed to step 256 and locate a new potential rootdisk. However, in some embodiments, if in step 262, the comparison does not result in a match between the valid hash value and the hash value associated with the potential rootdisk, then the system may not install the potential rootdisk and can trigger an error.

Figure 5:
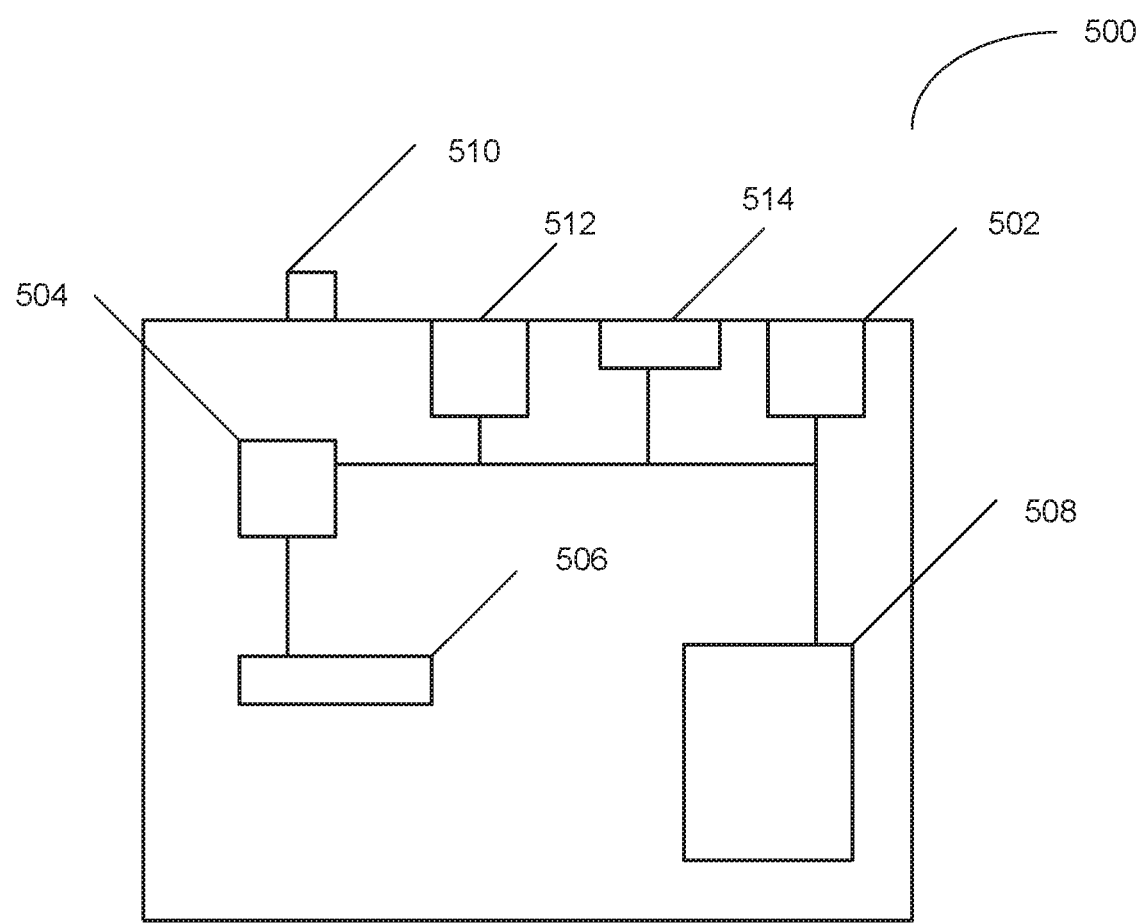
FIG. 5 depicts an embodiment of a hardware system adapted and configured for authenticating a rootdisk

FIG. 5 depicts an embodiment of a hardware system 500 adapted and configured for authenticating a rootdisk file. In the embodiment depicted in FIG. 5, the hardware system 500 can comprise a power supply 502, a CPU 504, memory 506, a storage device 508, one or more signal inputs 510, a communications link 512 and one or more out signal outputs 514. In some embodiments, each of the components 502-514 of the system can be in selective electrical communication with the other components 502-514 of the hardware system 500.

In operation, on an initial boot of the hardware system 500, a kernel system file or files can be instantiated into memory 506 and the storage device 508 can be accessed. A valid hash value can be generated based at least in part on information associated with a rootdisk file stored on the storage device 508. The valid hash value can be instantiated in memory 506. The kernel system file of files can then be modified to include the valid hash value. In subsequent system boots of the hardware system 500, the valid hash value can be retrieved from the kernel file or files and the hash value associated with a potential rootdisk file stored on the storage device 508 can be determined. Upon determination that the hash value associated with the potential rootdisk file stored on the storage device 508 matches the valid hash value retrieved from the kernel file or files, then the hardware system 500 can proceed with the boot process, otherwise the hardware system 500 can trigger an error message and/or search for an alternate potential rootdisk file.

Figure 6:
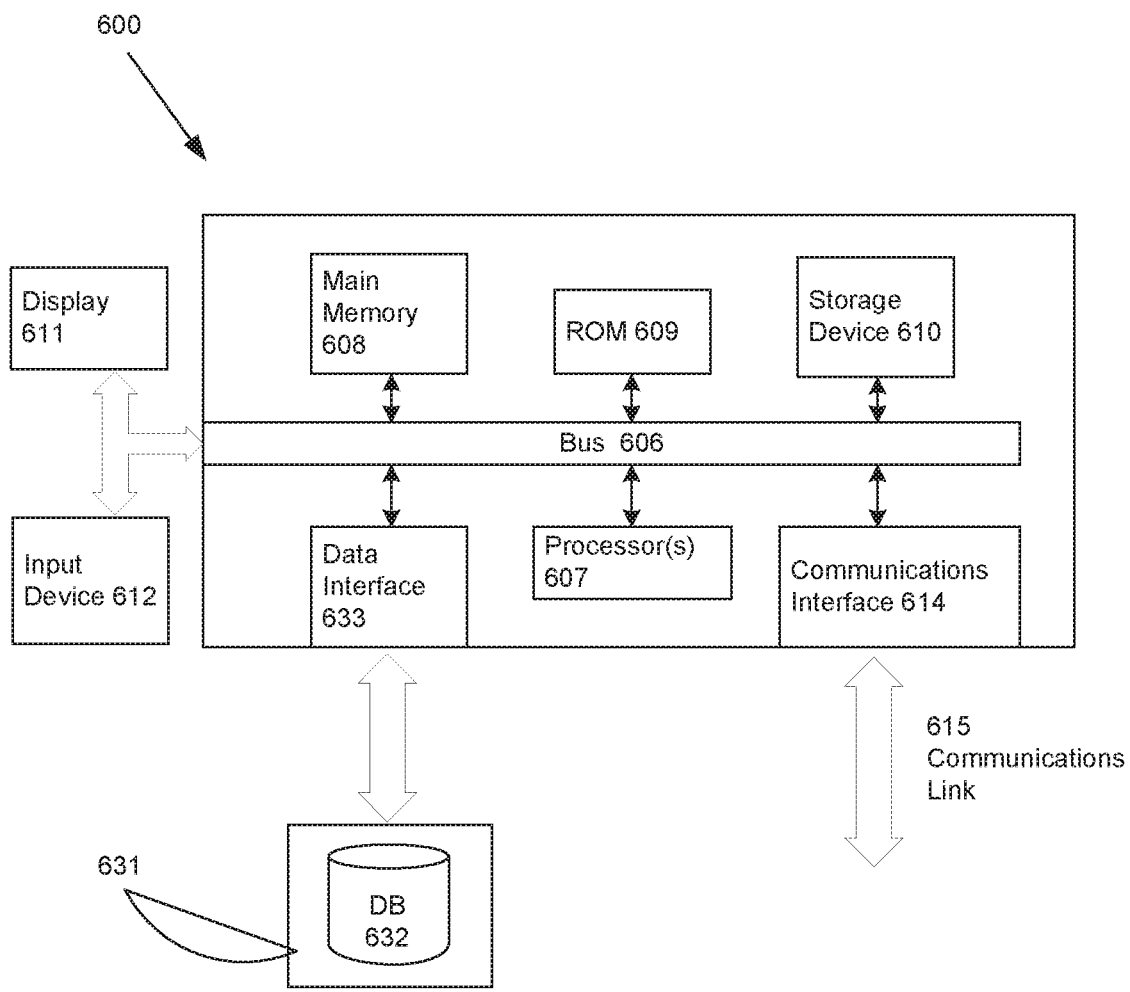
FIG. 6 depicts an embodiment of a hardware system for authenticating a rootdisk.

FIG. 6 depicts an embodiment of a hardware system for authenticating a rootdisk. The execution of the sequences of instructions required to practice the embodiments can be performed by a computer system 600 as shown in FIG. 6. In an embodiment, execution of the sequences of instructions is performed by a single computer system 600. According to other embodiments, two or more computer systems 600 coupled by a communication link 615 can perform the sequence of instructions in coordination with one another. Although a description of only one computer system 600 will be presented below, however, it should be understood that any number of computer systems 600 can be employed to practice the embodiments.

A computer system 600 according to an embodiment will now be described with reference to FIG. 6, which is a block diagram of the functional components of a computer system 600. As used herein, the term computer system 600 is broadly used to describe any computing device that can store and independently run one or more programs.

Each computer system 600 can include a communication interface 614 coupled to the bus 606. The communication interface 614 provides two-way communication between computer systems 600. The communication interface 614 of a respective computer system 600 transmits and receives electrical, electromagnetic or optical signals, that include data streams representing various types of signal information, e.g., instructions, messages and data. A communication link 615 links one computer system 600 with another computer system 600. For example, the communication link 615 can be a LAN, in which case the communication interface 614 can be a LAN card, or the communication link 615 can be a PSTN, in which case the communication interface 614 can be an integrated services digital network (ISDN) card or a modem, or the communication link 615 can be the Internet, in which case the communication interface 614 can be a dial-up, cable or wireless modem.

A computer system 600 can transmit and receive messages, data, and instructions, including program, i.e., application, code, through its respective communication link 615 and communication interface 614. Received program code can be executed by the respective processor(s) 607 as it is received, and/or stored in the storage device 610, or other associated non-volatile media, for later execution.

In an embodiment, the computer system 600 operates in conjunction with a data storage system 631, e.g., a data storage system 631 that contains a database 632 that is readily accessible by the computer system 600. The computer system 600 communicates with the data storage system 631 through a data interface 633. A data interface 633, which is coupled to the bus 606, transmits and receives electrical, electromagnetic or optical signals, that include data streams representing various types of signal information, e.g., instructions, messages and data. In embodiments, the functions of the data interface 633 can be performed by the communication interface 614.

Computer system 600 includes a bus 606 or other communication mechanism for communicating instructions, messages and data, collectively, information, and one or more processors 607 coupled with the bus 606 for processing information. Computer system 600 also includes a main memory 608, such as a random access memory (RAM) or other dynamic storage device, coupled to the bus 606 for storing dynamic data and instructions to be executed by the processor(s) 607. The main memory 608 also can be used for storing temporary data, i.e., variables, or other intermediate information during execution of instructions by the processor(s) 607.

The computer system 600 can further include a read only memory (ROM) 609 or other static storage device coupled to the bus 606 for storing static data and instructions for the processor(s) 607. A storage device 610, such as a magnetic disk or optical disk, can also be provided and coupled to the bus 606 for storing data and instructions for the processor(s) 607.

A computer system 600 can be coupled via the bus 606 to a display device 611, such as, but not limited to, a cathode ray tube (CRT) or a liquid-crystal display (LCD) monitor, for displaying information to a user. An input device 612, e.g., alphanumeric and other keys, is coupled to the bus 606 for communicating information and command selections to the processor(s) 607.

According to one embodiment, an individual computer system 600 performs specific operations by their respective processor(s) 607 executing one or more sequences of one or more instructions contained in the main memory 608. Such instructions can be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 607. Such a medium can take many forms, including, but not limited to, non-volatile, volatile and transmission media. Non-volatile media, i.e., media that can retain information in the absence of power, includes the ROM 609, CD ROM, magnetic tape, and magnetic discs. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Aspects of the subject matter described herein may be described in the general context of computer-executable instructions, such as program modules, being executed by a computer, such as the general purpose processors described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor.

A storage device may also store instructions, instructions, such as source code or binary code, for performing the techniques described above. A storage device may additionally store data used and manipulated by the computer processor. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A method of authentication comprising:
   accessing a kernel;
   determining a valid hash value associated with said kernel;
   accessing a potential rootdisk;
   determining a potential rootdisk hash value associated with said potential rootdisk, wherein said step of determining said potential hash value from said potential rootdisk is based at least in part on a hash table associated with said potential rootdisk;
   comparing said valid hash value and said potential rootdisk hash value;
   authenticating said potential rootdisk, if said valid hash value and said potential rootdisk hash value are identical x;
   rejecting said potential rootdisk, if said valid hash value and said potential rootdisk hash value are other than identical;

determining said valid hash value from a valid rootdisk, wherein said step of determining said valid hash value from said valid rootdisk is based at least in part on a hash table associated with said valid rootdisk; and encoding a valid hash value within said kernel.

2. The method of authentication of claim 1 further comprising:

rejecting said potential rootdisk, if said valid hash value and said potential rootdisk hash value are other than identical.

3. The method of authentication of claim 1 wherein said step of determining said potential hash value from said potential rootdisk is based at least in part on a hash table associated with said potential rootdisk.

\* \* \* \* \*